US008845935B2

(12) United States Patent
Liu et al.

(10) Patent No.: US 8,845,935 B2
(45) Date of Patent: Sep. 30, 2014

(54) METHOD FOR CAST MOLDING CONTACT LENSES

(75) Inventors: Alice Weimin Liu, Alpharetta, GA (US); Lance Kyle Lipscomb, Cumming, GA (US); Michael Schaub, Cumming, GA (US); Dawn A. Smith, Duluth, GA (US)

(73) Assignee: Novartis AG, Basel (CH)

( * ) Notice: Subject to any disclaimer, the term of this patent is extended or adjusted under 35 U.S.C. 154(b) by 796 days.

(21) Appl. No.: 12/381,256

(22) Filed: Mar. 10, 2009

(65) Prior Publication Data
US 2009/0230575 A1 Sep. 17, 2009

Related U.S. Application Data

(60) Provisional application No. 61/069,044, filed on Mar. 12, 2008.

(51) Int. Cl.
*B29D 11/00* (2006.01)
*B29C 33/40* (2006.01)
*B29L 11/00* (2006.01)
*B29K 67/00* (2006.01)

(52) U.S. Cl.
CPC ... *B29D 11/00125* (2013.01); *B29L 2011/0041* (2013.01); *B29C 33/40* (2013.01); *B29K 2067/00* (2013.01)
USPC ............ 264/1.32; 264/1.1; 264/2.5; 264/1.31

(58) Field of Classification Search
USPC .......................................... 264/1.32, 1.1, 2.5
See application file for complete search history.

(56) References Cited

U.S. PATENT DOCUMENTS

| | | | |
|---|---|---|---|
| 4,098,946 A | 7/1978 | Fuzek ............................ | 428/357 |
| 4,104,439 A | 8/1978 | Fuzek ............................ | 428/397 |
| 4,143,093 A | 3/1979 | Ruter ............................ | 525/444 |
| 4,219,628 A | 8/1980 | Weemes et al. ................ | 525/166 |
| 4,263,364 A | 4/1981 | Seymour et al. ............... | 428/300 |
| 4,506,045 A | 3/1985 | Wanizcek et al. .............. | 524/32 |
| 4,533,397 A | 8/1985 | Wingler et al. ................. | 106/181 |
| 4,567,114 A | 1/1986 | Oshima et al. ................. | 428/430 |
| 4,874,809 A | 10/1989 | Keep ............................ | 424/449 |
| 5,026,790 A | 6/1991 | Tyrell et al. ................... | 525/438 |
| 5,102,941 A | 4/1992 | Yamamoto et al. ............ | 524/425 |
| 5,106,941 A | 4/1992 | Jenkins et al. ................. | 538/272 |
| 5,207,967 A | 5/1993 | Small, Jr. et al. ........ | 264/328.16 |
| 5,225,319 A | 7/1993 | Fukazawa et al. ............. | 430/533 |
| 5,242,967 A | 9/1993 | Minnick ........................ | 524/411 |
| 5,324,816 A | 6/1994 | Khanna et al. ................. | 528/481 |
| 5,334,656 A | 8/1994 | Yamamoto et al. ............ | 525/63 |
| 5,382,628 A | 1/1995 | Stewart et al. ................ | 525/174 |
| 5,424,359 A | 6/1995 | Arashiro et al. ............... | 525/64 |
| 5,451,626 A | 9/1995 | Kumaki et al. ................ | 524/370 |
| 5,464,890 A | 11/1995 | Diaz-Kotti et al. ............. | 524/195 |
| 5,574,554 A | 11/1996 | Su et al. ........................ | 356/124 |
| 5,648,152 A | 7/1997 | Diaz-Kotti et al. ............. | 442/199 |
| 5,654,347 A | 8/1997 | Khemani et al. ............... | 521/138 |
| 5,654,395 A | 8/1997 | Jackson, Jr. et al. ........ | 528/308.3 |
| 5,716,765 A | 2/1998 | McGuckin et al. ............ | 430/372 |
| 5,739,193 A | 4/1998 | Walpita et al. ................ | 524/413 |
| 5,770,669 A * | 6/1998 | Robertson et al. ............ | 526/279 |
| 5,801,206 A | 9/1998 | Khemani et al. ............... | 521/81 |
| 5,910,363 A | 6/1999 | Rogers et al. ................ | 428/365 |
| 5,928,848 A | 7/1999 | Nair et al. ..................... | 430/510 |
| 6,236,061 B1 | 5/2001 | Walpita ........................ | 257/40 |
| 6,417,293 B1 | 7/2002 | Chorvath et al. .............. | 525/446 |
| 6,517,648 B1 | 2/2003 | Bouchette et al. ............. | 156/62.4 |
| 6,551,531 B1 * | 4/2003 | Ford et al. .................... | 264/2.5 |
| 6,569,958 B1 | 5/2003 | Gross et al. ................... | 525/446 |
| 6,638,451 B1 | 10/2003 | Hagmann et al. ............. | 264/1.38 |
| 6,821,108 B2 | 11/2004 | Hagmann et al. ............. | 425/412 |
| 6,861,123 B2 | 3/2005 | Turner | |
| 6,997,428 B1 | 2/2006 | Andino et al. ................ | 249/134 |
| 2001/0033948 A1 | 10/2001 | Murschall et al. ........... | 428/836.1 |
| 2003/0060575 A1 | 3/2003 | Caruso et al. ................. | 525/462 |
| 2003/0146536 A1 | 8/2003 | Sunderland et al. ..... | 264/172.17 |
| 2003/0164562 A1 * | 9/2003 | Li et al. ........................ | 264/1.32 |
| 2003/0203140 A1 | 10/2003 | Sapatova et al. ............. | 428/35.7 |
| 2004/0076823 A1 | 4/2004 | Yoshimura .................... | 428/373 |
| 2004/0127653 A1 | 7/2004 | Ellington et al. ............. | 525/439 |
| 2004/0154768 A1 | 8/2004 | Trokhan et al. ............... | 162/146 |
| 2004/0161682 A1 | 8/2004 | Wu et al. ...................... | 430/58.8 |
| 2004/0219364 A1 | 11/2004 | Shirk ............................ | 428/411.1 |
| 2005/0060953 A1 | 3/2005 | Altonen et al. ............... | 53/140 |
| 2005/0065293 A1 | 3/2005 | Vollenberg et al. ........... | 525/461 |
| 2005/0085618 A1 | 4/2005 | Katagiri ........................ | 528/272 |
| 2005/0113533 A1 | 5/2005 | Shaikh et al. ................. | 525/439 |
| 2005/0113534 A1 | 5/2005 | Agarwal et al. ............... | 525/439 |
| 2005/0228108 A1 | 10/2005 | Raghavendran .............. | 524/494 |
| 2005/0282952 A1 | 12/2005 | Takekoshi et al. ............ | 524/495 |
| 2005/0287895 A1 | 12/2005 | Bansal .......................... | 442/361 |
| 2006/0074202 A1 | 4/2006 | Juikar et al. .................. | 525/439 |
| 2006/0100331 A1 | 5/2006 | Parker et al. .................. | 524/322 |
| 2006/0115666 A1 | 6/2006 | Takekoshi et al. ............ | 428/480 |

(Continued)

FOREIGN PATENT DOCUMENTS

| | | |
|---|---|---|
| JP | 2001121557 A | 5/2001 |
| JP | 2006001286 A | 1/2006 |
| JP | 2007160706 A | 6/2007 |
| WO | WO 00/59713 | 10/2000 |

OTHER PUBLICATIONS

Material Data Sheet, Eastman Durastar Polymer DS1010 Natural—Jan. 14, 2009 (on line search).

(Continued)

*Primary Examiner* — Jeremiah Smith
(74) *Attorney, Agent, or Firm* — Jian Zhou

(57) ABSTRACT

The invention provide a method for cast-molding hydrogel contact lenses, especially silicone hydrogel contact lenses by using plastic molds of a poly(cycloalkylene-dialkylene terephthalate) copolymer. These plastic molds do not need to be degassed and stored in an oxygen-free atmosphere (e.g., $N_2$ or Ar) before being used for cast-molding silicone hydrogel contact lenses in the absence of oxygen and resultant silicone hydrogel lenses can still have relatively high ion permeability and relatively low variation in targeted optical power, compared with silicone hydrogel lenses made from a conventional mold material, such as polypropylene. The invention also provides plastic molds for cast-molding silicone hydrogel contact lenses.

12 Claims, No Drawings

(56) References Cited

U.S. PATENT DOCUMENTS

| | | | |
|---|---|---|---|
| 2006/0194946 A1 | 8/2006 | Thompson et al. | 528/491 |
| 2006/0205894 A1 | 9/2006 | Shaikh et al. | 525/437 |
| 2006/0210894 A1 | 9/2006 | Wu et al. | 430/66 |
| 2006/0216448 A1 | 9/2006 | Keep | 428/35.7 |
| 2007/0036878 A1 | 2/2007 | Goodenough et al. | 425/542 |
| 2007/0037897 A1* | 2/2007 | Wang et al. | 523/106 |
| 2007/0066706 A1 | 3/2007 | Manesis et al. | 523/106 |
| 2007/0173585 A1 | 7/2007 | Sevenich et al. | 524/445 |
| 2007/0190884 A1 | 8/2007 | Chen et al. | 442/400 |
| 2007/0213473 A1 | 9/2007 | Yu et al. | 525/446 |
| 2007/0216067 A1 | 9/2007 | Bahr et al. | 264/328.1 |

OTHER PUBLICATIONS

DuraStar DS1010—Eastman Chemical Co.—Polyester, Thermoplastic—Jan. 14, 2009 (on line search).

Eastman DuraStar Polymer DS1010 Natural—Jan. 14, 2009 (on line search—material data sheet).

Eastman Durastar Polymer DS1010 Natural PCTA Copolymer—Jan. 14, 2009 (on line search.

PCT Written Opinion of the International Searching Authority.

PCT International Search Report.

* cited by examiner

METHOD FOR CAST MOLDING CONTACT LENSES

This application claims the benefit under 35 U.S.C. §119 (e) of U.S. provisional application Ser. No. 61/069,044 filed Mar. 12, 2008, herein incorporated by reference in its entirety.

The present invention relates to improvements in cast molding of contact lenses. In particular, the present invention is related to a method of cast-molding contact lenses comprises injection molding at least one of sections from a poly (cycloalkylenedialkylene terephthalate) copolymer. In addition the invention provides a mold half made from a mold material comprising a poly(cycloalkylenedialkylene terephthalate) copolymer.

BACKGROUND OF THE INVENTION

Silicone hydrogel contact lenses can be manufactured economically in large numbers by a conventional full-mold process involving disposable molds. In a conventional molding process, a predetermined amount of a polymerizable material typically is introduced into a disposable mold comprising a female (concave) mold half and a male (convex) mold half. The female and male mold halves cooperate with each other to form a mold cavity having a desired geometry for a contact lens. Normally, a surplus of polymerizable material is used so that when the male and female halves of the mold are closed, the excess amount of the material is expelled out into an overflow area adjacent to the mold cavity. The polymerizable material remaining within the mold is polymerized by means of actinic radiation (e.g., UV irradiation, ionized radiation, microwave irradiation) or by means of heating. The starting material in the mold cavity is cured to form a lens while the excess material in the overflow area is partially or completely cured to form flashes. After curing, the mold is separated into the male and female mold halves with the formed lens adhered onto either male or female mold half.

A various mold materials can be used to make disposable molds for contact lenses (for example, U.S. Pat. Nos. 5,843,346, 5,849,209, 5,975,875, 5,965,630, 6,551,531, 6,638,451, and 6,821,608, and U.S. Published Patent Application No. 2007/0036878A1). However, various problems may exist when using these known mold materials for making mold for the product of silicone hydrogel contact lenses. First, some mold materials may have relatively large non uniform anisotropic shrinkage over time after injection molding, causing dimensional changes in molds and large fluctuations in the parameters (peak refractive index, diameter, basic curve, central thickness etc.) of contact lenses produced from the molds to be produced.

Second, some mold materials have inadequate chemical resistance to silicone hydrogel lens formulation. Typically, a silicone hydrogel lens formulation comprises one or more organic solvent and hydrophilic and hydrophobic vinylic monomers. The organic solvent and vinylic monomers, alone or in combination, may be able to chemically and/or physically etch away some part of the mold surfaces of molds. As such, the resultant lenses made from those molds may have damaged lens surfaces.

Third, some mold materials have high oxygen permeability. Cast molding of silicone hydrogel contact lenses using molds made from those mold materials with high oxygen permeability may have to carried out under oxygen-free atmosphere or under a stringent control to minimize the adverse effect of oxygen on the ion permeability of resultant lenses. It is known that on-eye movement of a contact lens is required to ensure good tear exchange, and ultimately, to ensure good corneal health. Ion permeability is one of the predictors of on-eye movement, because the ion permeability is believed to be directly proportional to the permeability of water. High ion permeability is one of desirable properties of a silicone hydrogl contact lens. When a mold made of a material with high oxygen permeability is used to cast-mold-silicone hydrogel lenses, the resultant lenses may have low ion permeability.

Fourth, some mold materials may not have adequate UV transmissibility when the curing of a lens formulation in a mold is carried out by UV irradiation.

Because the known lens mold materials can have one or more problems discussed above, there still exists a need in the art for mold materials suitable for cast-molding of silicone hydrogel contact lenses with high quality and an improved method of cast molding silicone hydrogel contact lenses with molds formed from these mold materials.

SUMMARY OF THE INVENTION

The present invention provides a method of cast molding contact lenses, in particular silicone hydrogel contact lenses, wherein a lens forming material is cured in the lens-shaped cavity formed between molding surfaces of a male and a female mold halves, wherein at least one of mold halves comprises, consists essentially of, or consists of a poly(cycloalkylenedialkylene terephthalate) copolymer.

DETAILED DESCRIPTION OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized and comprises one or more actinically crosslinkable groups. Low molecular weight typically means average molecular weights less than 700 Daltons.

An "actinically-crosslinkable group" refers to a group which can react with another group of same type or different type to form a covalent linkage upon actinic irradiation. Examples of actinically-crosslinkable groups include without limitation acryl groups $$\begin{matrix} H_2C=\underset{H}{C}-\underset{\parallel}{C}- & & H_2C=\underset{CH_3}{C}-\underset{\parallel}{C}- \\ ( & O & \text{or} & O & ), \end{matrix}$$

thiol groups, and ene-containing groups. Acryl groups can undergo free-radical chain reaction upon actinic irradiation. Thiol groups (—SH) and ene-containing groups can participate in thiol-ene step-growth radical polymerization as described in a commonly-owned copending US patent application publication No. 2008/0143958 A1, herein incorporated in reference in its entirety.

A "ene-containing group" is a mono-valent or divalent radical contains a carbon-carbon double which is not directly linked to a carbonyl group (—CO—), nitrogen atom, or oxygen atom.

A "vinylic monomer", as used herein, refers to a monomer that has an ethylenically unsaturated group and can be polymerized actinically or thermally.

The term "olefinically unsaturated group" or "ethylentically unsaturated group" is employed herein in a broad sense and is intended to encompass any groups containing a >C=C< group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic monomer" refers to a monomer which can be polymerized to form a polymer that is water-soluble or can absorb at least 10 percent by weight of water.

A "hydrophobic monomer", as used herein, refers to a monomer which is polymerized to form a polymer that is insoluble in water and can absorb less than 10 percent by weight water.

A "macromer" refers to a medium and high molecular weight compound which can be polymerized and/or crosslinked and-comprise one or more actinically-crosslinkable groups. Medium and high molecular weight typically means average molecular weights greater than 700 Daltons.

A "prepolymer" refers to a starting polymer which contains actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to three or more.

A "photoinitiator" refers to a chemical that initiates radical crosslinking/polymerizing reaction by the use of light.

A "thermal initiator" refers to a chemical that initiates radical crosslinking/polymerizing reaction by the use of heat energy.

A "lens-forming material" refers to a fluid material which can be polymerized and/or crosslinked actinically or thermally to form a contact lens. Lens-forming materials are well known to a person skilled in the art.

The term "fluid" as used herein indicates that a material is capable of flowing like a liquid.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm^2\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm $$\left(\frac{90 \times 10^{-10}}{0.09} = 100 \times 10^{-9}\right)$$

(oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "oxygen permeability", Dk, of a polymeric material as a mold material is conventionally expressed in cc·μm/m²·day·atm at a specific temperature and relative humidity as defined by the AST method D-3985 of classification. Oxygen permeability indicates a mold material's ability to transmit oxygen and is used to predict performance of plastic barriers to gasses.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]
A=area of lens exposed [mm²]
D=Ionoflux Diffusion Coefficient [mm²/min]

dc=concentration difference [mol/L]

dx=thickness of lens [mm]

The Ionoton Ion Permeability Coefficient, P, is then determined in accordance with the following equation:

$$ln(1-2C(t)/C(0))=-2APt/Vd$$

where: $C(t)$=concentration of sodium ions at time t in the receiving cell $C(0)$=initial concentration of sodium ions in donor cell A=membrane area, i.e., lens area exposed to cells V=volume of cell compartment (3.0 ml)

d=average lens thickness in the area exposed

P=permeability coefficient

An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

The invention is partly based on the discovery that, when a poly(cycloalkylene-dialkylene terephthalate) copolymer is used to make lens molds for producing silicone hydrogel contact lenses, the molds do not need to be degassed and stored in an oxygen-free atmosphere (e.g., $N_2$ or Ar) before being used for making lenses and silicone hydrogel lenses made from these molds have relatively high ion permeability and relatively low variation in targeted optical power, compared with silicone hydrogel lenses made from a conventional mold material, such as polypropylene.

Although the inventors do not wish to be bound by any particular theory, it is assumed that oxygen, which can migrate to the molding surfaces of the mold during the polymerization process, inhibits polymerization of the lens material at or near the lens surface and could adversely the ion permeability of resultant silicone hydrogel lenses. A silicone hydrogel lens with low ion permeability may not have adequate on-eye movement. It is believed that because poly(cycloalkylene-dialkylene terephthalate) copolymers have low oxygen permeability and high chemical resistance to silicone hydrogel lens formulations, molds made from this class of mold material can serve as an oxygen barrier to prevent oxygen from reaching lens formulation during polymerization, thereby minimizing the adverse effects of oxygen on the ion permeability of silicone hydrogel lenses made therefrom. Silicone hydrogel lenses cast-molded in molds of the invention can have high ion permeability, even in the presence of oxygen. Furthermore, because poly(cycloalkylene-dialkylene terephthalate) copolymers have small, linear mold shrinkage, dimensional changes in molds are small and as such, fluctuations in the parameters (peak refractive index, diameter, basic curve, central thickness etc.) of resultant contact lenses are minimized.

The invention is also partly based on unexpected discovery that a smoother surface of molded contact lenses can be obtained when a polyester plastics, such as poly(cycloalkylene-dialkylene terephthalate) copolymers, is used as mold materials for lens molds. It is found that lenses molded with molds made of such materials have much less visible lathe rings (lathing traces transferred from mold tools for making molds to the lenses molded therefrom) than those molded molds made of polypropylene.

It is believed that when the molding surfaces of a mold made of e.g., a poly(cycloalkylene-dialkylene terephthalate) copolymer is in contact with a silicone hydrogel lens forming material, there is localized limited swelling of mold materials near the molding surfaces of the mold. Such localized limited swelling of mold materials near molding surfaces results in much smoother surfaces of the molded contact lens.

The present invention provides a method for cast-molding contact lenses. The method comprises polymerizing a lens-forming material in a mold to form a contact lens, wherein the mold has a first mold half having a first molding surface in contact with the lens-forming material and a second mold half having a second molding surface in contact with the lens-forming material, wherein said first mold half and said second mold half are configured to receive each other such that the cavity is formed between said first and second molding surfaces, wherein at least one of the first and second mold halves comprises a poly(cycloalkylene-dialkylene terephthalate) copolymer, wherein the poly(cycloalkylene-dialkylene terephthalate) copolymer comprises repeating units from at least 90 mole percent terephthalic acid and at least 90 mole percent of a $C_6$-$C_{24}$ cycloaliphatic diol (i.e., a cycloaliphatic compound having two hydroxyl groups), based on 100 mole percent dicarboxylic acid and 100 mole percent diol.

One of the mold surfaces of a mold defines the front or anterior surface (i.e., the surface facing away from the eye during wear) of a contact lens, the other molding surface defines the rear or posterior surface (i.e., the surface facing towards the eye during wear) of a contact lens.

In a preferred embodiment, a poly(cycloalkylene-dialkylene terephthalate) copolymer substantially consists of repeating units from terephthalic acid and a $C_6$-$C_{24}$ cycloaliphatic diol.

Any $C_6$-$C_{24}$ cycloaliphatic diols can be used in the invention. Preferably, $C_6$-$C_{24}$ cycloaliphatic diol is any one of or combination of diols of formula (I), (II) and (III)

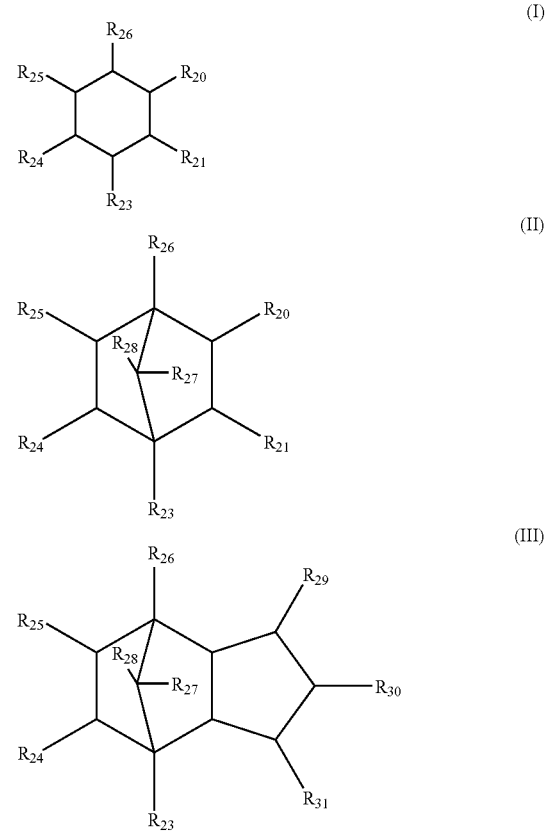

in which one of $R_{20}$ and $R_{21}$ is $C_1$-$C_3$ hydroxyalkyl and the other is hydrogen or $C_1$-$C_3$ alkyl; one of $R_{24}$ and $R_{25}$ is $C_1$-$C_3$ hydroxyalkyl and the other is hydrogen or $C_1$-$C_3$ alkyl; one of $R_{29}$, $R_{30}$ and $R_{31}$ is $C_1$-$C_3$ hydroxyalkyl and the other two independent of each other are hydrogen or $C_1$-$C_3$ alkyl; $R_{23}$, $R_{26}$, $R_{27}$, and $R_{28}$ independent of each other are hydrogen or $C_1$-$C_3$ alkyl. More preferably, $C_6$-$C_{24}$ cycloaliphatic diol is 1,4-cyclohexenedimethanol; a diol of formula (II) in which $R_{20}$ and $R_{24}$ are hydroxymethyl, $R_{21}$ and $R_{25}$ are hydrogen, and $R_{23}$, $R_{26}$, $R_{27}$, and $R_{28}$ independent of each other are hydrogen or methyl; a diol of formula (III) in which $R_{30}$ and $R_{24}$ are hydroxymethyl, $R_{21}$, $R_{22}$, $R_{23}$, $R_{25}$, $R_{26}$, $R_{27}$, $R_{28}$, $R_{29}$, and $R_{31}$ independent of each other are hydrogen or methyl; or combination thereof.

In accordance with the invention, molds made of poly (cycloalkyienedialkylene terephthalate) copolymer are chemical resistant to a silicone hydrogel lens formulation and capable of being used in cast molding a silicone hydrogel contact lens with increased ion permeability in the presence of oxygen.

The term "in the presence of oxygen", in reference to cast molding of a silicone hydrogel contact lens, means that the silicone hydrogel lens formulation is not degassed (with nitrogen or argon) and the mold is not degassed and stored in an oxygen-free atmosphere, and the lens formulation dispensing, dosing and curing takes place under ambient conditions.

The term "an increased ion permeability" as used herein means that the ion permeability of a silicone hydrogel lens obtained by cast molding of a silicone hydrogel lens formulation in a mold of poly(cycloalkylenedialkylene terephthalate) copolymer is at least 1.5 folds, preferably at least two folds of the ion permeability of a control silicone hydrogel lens obtained by cast molding of a silicone hydrogel lens formulation in a mold of polypropylene (e.g., preferably Huntsman polypropylene homopolymer P4C5N-046). It is understood that both control molds and testing molds must be under the substantially identical aging conditions (i.e., stored in the ambient environment for the same length of period of time).

Lens molds for making contact lenses are well known to a person skilled in the art and, for example, are employed in cast molding or spin casting. Methods of manufacturing mold sections for cast-molding a contact lens are generally well known to those of ordinary skill in the art. The process of the present invention is not limited to any particular method of forming a mold. In fact, any method of forming a mold can be used in the present invention. The preferred method of making the molds of the invention is by injection molding using known techniques, but the molds could be made by other techniques lathing, diamond turning, or laser cutting.

In general, a mold comprises at least two mold sections (or portions) or mold halves, i.e. male and female mold halves. The male mold half defines a first molding (or optical) surface defining the posterior (concave) surface of a lens and the second mold half defines a second molding (or optical) surface defining the anterior (convex) surface of a lens. The first and second mold halves are configured to receive each other such that a lens forming cavity is formed between the first molding surface and the second molding surface. The molding surface of a mold half is the cavity-forming surface of the mold and in direct contact with lens-forming material.

A lens-forming material can be introduced (dispensed) into a cavity formed by a mold according to any known methods.

Any lens-forming materials can be used in the invention. Lens forming materials that are suitable in the fabrication of contact lenses are illustrated by numerous issued US patents and familiar to those skilled in the art. Preferred lens-forming materials are capable of forming hydrogels. A lens-forming material can comprises at least one member selected from the group consisting of a hydrophilic monomer, a hydrophobic monomer, a macromer, a prepolymer, a crosslinking agent with molecular weight less than 1000 Daltons, and a mixture thereof. A lens-forming material can further include other components, such as an initiator (e.g., a photoinitiator or a thermal initiator), a visibility tinting agent, UV-blocking agent, photosensitizers, and the like. Preferably, a silicone hydrogel lens-forming material used in the present invention comprises a silicone-containing macromer or prepolymer.

Preferably, a silicone hydrogel lens-forming material is used in the invention. The silicone hydrogel lens-forming material comprises at least one silicon-containing monomer, or at least one silicone-containing macromer, at least one silicone-containing prepolymer, or a mixture thereof. Alternatively, a silicone hydrogel lens-forming material can be any lens formulations for making silicone hydrogel contact lenses. Exemplary lens formulations include without limitation the formulations of lotrafilcon A, lotrafilcon B, etafilcon A, genfilcon A, lenefilcon A, polymacon, acquafilcon A, balafilcon, senofilcon A, comfilcon A, and the like.

Any monomers suitable for making contact lenses can be used in the invention. Preferably, acryl group containing monomers are used in the invention.

Examples of silicone-containing and acryl-containing monomers include, without limitation, 3-methacryloxy propylpentamethyldisiloxane, bis(methacryloxypropyl)tetramethyl-disiloxane, N-[tris(trimethylsiloxy)silylpropyl]acrylamide, N-[tris(trimethylsiloxy)silylpropyl]methacrylamide, and tristrimethylsilyloxysilylpropyl methacrylate (TRIS), N-[tris(trimethylsiloxy)silylpropyl]methacrylamide ("TS-MAA"), N-[tris(trimethylsiloxy)-silylpropyl]acrylamide ("TSAA"), (3-methacryloxy-2-hydroxypropyloxy)propylbis (trimethylsiloxy)methylsilane), (3-methacryloxy-2-hydroxypropyloxy)propyltris(trimethylsiloxy)silane, 3-methacryloxy-2-(2-hydroxyethoxy)propyloxy)propylbis (trimethylsiloxy)methylsilane, N-2-methacryloxyethyl-O-(methyl-bis-trimethylsiloxy-3-propyl)silyl carbamate, silicone-containing vinyl carbonate or vinyl carbamate monomers (e.g., 1,3-bis[4-vinyloxycarbonyloxy)but-1-yl] tetramethyl-disiloxane; 3-(trimethylsilyl), propyl vinyl carbonate, 3-(vinyloxycarbonylthio )propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethylsiloxyethyl vinyl carbonate; trimethylsilylethyl vinyl carbonate, and trimethylsilylmethyl vinyl carbonate).

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Nearly any hydrophilic monomer that can be used in making hydrogel contact lenses can be used in the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, N-vinyloxycarbonyl-L-alanine, N-vinyl formamide, N-vinyl acetamide, N-vinyl isopropylamide, N-vinyl-N-methyl acetamide, allyl alcohol, and N-vinyl caprolactam.

Nearly any hydrophobic monomer that can be used in making contact lenses can be used in the invention. Preferred hydrophobic monomers include without limitation methylacrylate, ethyl-acrylate, propylacrylate, isopropylacrylate, cyclohexylacrylate, tert-butyl methacrylate, isobonyl methacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, and hexafluorobutyl methacrylate.

Any actinically crosslinkable prepolymers can be used in the invention. Examples of actinically crosslinkable prepolymers include, but are not limited to, a water-soluble crosslinkable prepolymer described in U.S. Pat. Nos. 5,583,163, 6,303,687, 5,849,841, 6,479,587, 5,712,356, 5,665,840, 6,492,478, 6,165,408, 6,221,303 and 6,472,489 and in U.S. Patent Application Publication Nos. 2004/0082680 A1 and 2005/0113549 A1 (herein incorporated by reference in their entireties) and actinically-crosslinkable silicone-containing prepolymers described in U.S. Pat. Nos. 6,039,913, 7,091,283, 7,268,189 and 7,238,750, and in U.S. patent application Ser. Nos. 09/525,158, 11/825,961, 12/001,562, 12/001,521, 12/077,772, 12/077,773 (incorporated herein by references in their entireties).

The lens-forming material can comprise one or more crosslinking agents (i.e., compounds with two or more acryl groups or three or more thiol or ene-containing groups and with molecular weight less than 700 Daltons). Examples of preferred vinylic crosslinkers include without limitation ethyleneglycol dimethacylate (EGDMA), dienthylene glycol dimethacrylate, tetraethyleneglycol dimethacrylate (TEGDMA), triethyleneglycol dimethacrylate (TrEGDMA), polyethylene glycol dimethacrylate, triallyl isocyanurate, ethylenediamine dimethyacrylamide, glycerol dimethacrylate, and combinations thereof.

In accordance with the present invention, a lens-forming material can be a solution or a solvent-free liquid or melt at a temperature below about 80° C. A person skilled in the art will known well how to prepare silicone hydrogel lens-forming material.

For example, a solution can be prepared by dissolving a lens-forming material in any suitable solvent known to a person skilled in the art. Examples of suitable solvents include without limitation water, alcohols, such as $C_1$-$C_{14}$ alkanols (preferred examples: ethanol, methanol or isopropanol), carboxylic acid amides (e.g., dimethylformamide), dipolar aprotic solvents (e.g. dimethyl sulfoxide, methyl ethyl ketone, ketones (e.g., acetone or cyclohexanone), hydrocarbons (e.g., toluene, ethers, THF, dimethoxyethane or dioxane), and halogenated hydrocarbons (e.g., trichloroethane), mixtures of water with an alcohol, mixture of water with one or more organic solvents, and mixtures of two or more organic solvents.

It must be understood that a lens-forming material can also comprise various components, such as, for example, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles or stabilized silver nanoparticles), bioactive agent, leachable lubricants ((e.g., non-crosslinkable hydrophilic polymers, such as, for example, polyvinylalcohols (PVAs), polyethylene oxide, polyethylene-polypropylene block copolymers, polyamides, polyimides, polylactone, polyvinylpyrrolidone homopolymer or copolymer, polyacrylamide, polymethaacrylamide, etc.), fillers, and the like, as known to a person skilled in the art.

Examples of suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, reactive photoinitiators disclosed in EP 632 329 (herein incorporated by reference in its entirety). Examples of benzoylphosphine oxide initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. The polymerization can then be triggered off by actinic radiation, for example light, in particular UV light of a suitable wavelength. The spectral requirements can be controlled accordingly, if appropriate, by addition of suitable photosensitizers.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is azobisisobutyronite (AIBN).

In a preferred embodiment, the method of the invention is characterized by being capable of cast-molding silicone hydrogel contact lenses in the presence of oxygen, wherein the resultant silicone hydrogel contact lenses have at least one property selected from the group consisting of an apparent oxygen permeability of at least 40 barrers, an lonoflux Diffusion Coefficient, D, of greater than about $1.5 \times 10^{-6}$ $mm^2/m$ in, an elastic modulus of from about 0.2 MPa to about 2.0 MPa, and a water content of from about 15% to about 80% by weight when fully hydrated.

A person skilled in the art will know well how to cast mold lenses from a lens-forming material in molds based on thermal or actinic polymerization (e.g., UV irradiation or gamma or X-ray irradiation).

Opening of the mold so that the molded lens can be removed from the mold may take place in a manner known to a person skilled in the art.

A mold of the invention is capable of producing contact lenses having reduced lathe marks, compared to a polypropylene mold as control, without polishing the surfaces of mold tools for injection molding of both the mold of invention and the polypropylene mold to remove the lathe marks on the mold tools.

The term "lathe rings" refers to a type of lathe marks which are in ring shape and observed using microscopic contrast technique.

In a preferred embodiment, the method of the invention further comprises the steps of dispensing the lens forming material in the mold; closing the mold; waiting for at least about 1 minutes, preferably at least about 2 minutes, more preferably at least about 5 minutes, even more preferably from about 1 minutes to about 45 minutes, after closing the mold but before polymerizing the lens forming material in the mold, thereby ensuring a localized limited swelling of the mold at and near the molding surfaces. The produced lenses in this preferred embodiment are characterized by having significantly reduced lathe marks observed using a microscopic contrast technique known as Reflective Differential Interference Contrast (RDIC), relative to those produced with polypropylene molds.

The molded contact lenses can further subject to further processes known to a person skilled in the art, such as, for example, extraction, surface treatment, hydration, sterilization, and the like.

The previous disclosure will enable one having ordinary skill in the art to practice the invention. In order to better enable the reader to understand specific embodiments and the advantages thereof, reference to the following examples is suggested.

EXAMPLE 1

Oxygen permeability measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H.D. Cavanagh Ed., Raven Press: N.Y. 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$ /min., while a nitrogen stream is passed on the opposite side of the lens at a rate of about 10 to 20 $cm^3$ /min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2/cm^2$ -minute]
 $P_{oxygen}=(P_{measured}-P_{water}$ vapor)=(% $O_2$ in air stream) [mm Hg]=partial pressure of oxygen in the air stream
 $P_{measured}$=barometric pressure (mm Hg)
 $P_{water}$ vapor=0 mm Hg at 34° C. (in a dry cell) (mm Hg)
 $P_{water}$ vapor=40 mm Hg at 34° C. (in a wet cell) (mm Hg)
 t=average thickness of the lens over the exposed test area (mm)
where $Dk_{app}$ is expressed in units of barrers.

The oxygen transmissibility (Dk/t) of the material may be calculated by dividing the oxygen permeability ($Dk_{app}$) by the average thickness (t) of the lens.

The "oxygen permeability", Dk, of a polymeric material as a mold material is conventionally expressed in cc·μm/$m^2$·day·atm at a specific temperature and relative humidity as defined by the AST method D-3985 of classification.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314\times10^{-3}$ $mm^2$/minute.

EXAMPLE 2

Synthesis of Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g). 13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colourless and clear. It can be stored in air at room temperature for several months in the absence of light without any change in molecular weight.

Formulations

The above prepared siloxane-containing macromer is use in preparation of two formulations used in the following examples. Each components and its concentration are listed in Table I.

TABLE I

| Formulation | Macromer | TRIS | DMA | Darocure® 1173 | CuP dispersion* | Ethanol |
|---|---|---|---|---|---|---|
| I | 40.9 | 16.4 | 24.6 | 0.5 | 0 | 17.6 |
| II | 25.9 | 19.2 | 28.9 | 1 | 0.10 | 25 |
| III | 18.4 | 27.0 | 30.0 | 0.8 | 0.10 | 24.2 |

*The CuP dispersion is a 5% by weight of copper phthalocyanin dispersed in TRIS.

EXAMPLE 3

An amount of formulation II in Example 2 is introduced into each molds which are obtained by injection molding of different mold materials. The tested mold materials include Durastar DS1010 (poly(cyclohexylenedimethylene terephthalate) from Eastman, Huntsman polypropylene homopolymer P4C5N-046, Arkema Group Plexiglas® V920-UVT General Purpose Acrylic Resin, Mitsui Chemicals' APEL™, a cyclo olefin copolymer(COC) (Grade APL6105T) (cloolefin-polyethylene copolymer), Zeon Chemicals' Zeonor® 1060R (cyclo olefin copolymer), and GE's Xylex resin (x7509HP). All lens molds are not stored in nitrogen nor irradiated with UV immediately prior to leas casting. The control lens molds (Huntsman polypropylene homopolymer P4C5N-046) are stored in ambient environment for one day prior to casting. The molds of other testing mold materials are stored in ambient environment for 7 days prior to cast molding. The lens formulation is not degassed. The lens formulation is cured in the molds under UV irradiation to form contact lenses. After cast-molding, the subassemblies (molds with lenses therein) are staged for 14 days (i.e., stored in ambient environment. The molds are separated according to any method know to a person skilled in the art, preferably according a procedure described in U.S. published patent Application Nos. 2006/0202368 A1 and 2007/0158865 A1. The lenses are then extracted as known to a person skilled in the art, for example, in an alcohol, such as methanol, ethanol, propanol or isopropanol (preferably in isopropanol), for a period of time sufficient to remove unpolymerized components (for example, from several minutes to several hours, e.g., 2-4 hours). The lenses after extraction are hydrated in water. After hydration, all of uncoated lenses will be dried and plasma coated using a plasma machine according to a process described in U.S. Pat. No. 6,881,269 (herein incorporated by reference in its entirety). The plasma coated lenses are hydrated, then packaged in phosphate buffered saline, and finally autoclaved.

For instance, it is found that mold materials, Plexiglas® V920-UVT General Purpose Acrylic Resin and Xylex resin (x7509HP) have low chemical resistance to the lens formulation, as shown by damaged mold surfaces and surfaces of resultant lenses.

The ion permeability of the plasma-coated lenses are measured according to the procedure described in Example 1 and reported in Table II. The lenses cast-molded with poly(cyclohexylenedimethylene terephthalate) molds have ion permeability about 3.6 folds higher than the ion permeability of the control lenses (i.e., cast-molded with polypropylene molds). When coated lenses are tested with water soluble low MW methylene blue, it is found that plasma coated control lenses (i.e., cast-molded with polypropylene molds) is slightly stained while the coated lenses cast molded with poly(cyclohexylenedimethylene terephthalate) molds are stained. These results indicate the much higher ion permeability of the lenses cast-molded with poly(cyclohexylenedimethylene terephthalate) molds compared to the control lenses, consistent with the measurements of ion permeability of lenses.

TABLE II

| | Control PP | Durastar DS1010 | Plexiglas® V920-UVT | Xylex resin | Zeonor® 1060R |
|---|---|---|---|---|---|
| IP | 1.8 ± 0.6 | 6.4 ± 0.3 | 4.6 ± 0.9 | 6.4 ± 0.6 | 0.4 ± 0.1 |

IP: ion permeability;

Control lenses made with molds of polypropylene and lenses cast-molded with poly(cyclohexylenedimethylene terephthalate) molds have comparable oxygen permeability, around 74 barrers. Variations in lens diameter and optical power for lenses made with molds of poly(cyclohexylenedimethylene terephthalate) are much smaller than those for control lenses made with molds of polypropylene.

EXAMPLE 4

An amount of formulation II in Example 2 is introduced into each molds which are obtained by injection molding of different mold materials. The tested mold materials include Durastar DS1010 (poly(cyclohexylenedimethylene terephthalate)) from Eastman and Huntsman polypropylene homopolymer P4C5N-046 as control. Prior to injection molding of Durastar DS1010, the resin is dried for 3-4 hours at 71° C. in a dryer (ConAir SL25). All lens molds are not stored in nitrogen nor irradiated with UV immediately prior to leas casting. The control lens molds (Huntsman polypropylene homopolymer P4C5N-046) are stored in ambient environment for one day prior to casting. The molds of poly(cyclohexylenedimethylene terephthalate) are stored in ambient environment for one day (for the first group of molds) and 7 days (for the second group of molds) prior to cast molding. The lens formulation is not degassed. The lens formulation is cured in the molds under UV light to form contact lenses. After cast-molding, the subassemblies (molds with lenses therein) are staged for one day (i.e., stored in ambient environment). The molds are separated according to any method know to a person skilled in the art, preferably according a procedure described in U.S. published patent Application Nos. 2006/0202368 A1 and 2007/0158865 A1. The lenses are then extracted as known to a person skilled in the art, for example, in an alcohol, such as methanol, ethanol, propanol or isopropanol (preferably in isopropanol), for a period of time sufficient to remove unpolymerized components (for example, from several minutes to several hours, e.g., 2-4 hours). The lenses after extraction are hydrated in water. After hydration, all of uncoated lenses will be dried and plasma coated using a plasma machine according to a process described in U.S. Pat. No. 6,881,269 (herein incorporated by reference in its entirety). The plasma coated lenses are hydrated, then packaged in phosphate buffered saline, and finally autoclaved.

The ion permeability of coated lenses are measured according to the procedure described in Example 1 and are reported in Table III. The lenses cast-molded with poly(cyclohexylenedimethylene terephthalate) molds even aged for 7 days in the ambient environment have ion permeability about 1.4 to 4.5 folds higher than the ion permeability of the control lenses (i.e., cast-molded with polypropylene molds aged for one day in the ambient environment).

TABLE III

| | Control (PP molds) | Durastar DS1010 molds mold age = 1 day | Durastar DS1010 molds mold age = 7 days |
|---|---|---|---|
| IP | 1.28 | 6.65 | 5.78 |

Control lenses made with molds of polypropylene and lenses cast-molded with poly(cyclohexylenedimethylene terephthalate) molds have comparable oxygen permeability.

EXAMPLE 5

Lenses are prepared from lens formulation III prepared in Example 2 according to procedures described in Example 4 using Durastar MN631 as testing mold material and polypropylene (Huntsman P4-046) as control mold material. The molded lenses are subjected to extraction with isopropanol and hydration in DI water. The plasma gas is a mixture of 79% $N_2$ and 21 $O_2$.

Lenses are flattened on a glass microscope slide by cutting the lens radially every ~90 degrees around the lens. Any excess water is then blown off the surface with compressed air. The dry lens surface is then observed using a microscopic contrast technique known as Reflective Differential Interference Contrast (RDIC) at ~100×, ~200× and/or sometimes ~500× magnification. Digital images of the lens surfaces of test groups are compared to control groups to assess any differences in the appearance of lathe rings. Alternately, where necessary, lenses are desalinated in DI water, cut, flattened and then examined by RDIC or allowed to air dry after desalination before examining by RDIC.

It is observed that lenses cast in polypropylene molds have more visible lathe rings compared to those cast in Durastar MN631 molds with the same set of mold tooling (used for injection molding of molds).

We claim:

1. A method of cast molding contact lenses in the presence of oxygen, wherein the contact lenses have significantly reduced lathe marks observed using a microscopic contrast technique known as Reflective Differential Interference Contrast (RDIC), relative to a control silicone hydrogel lens obtained by cast molding of the silicone hydrogel lens formulation in a mold of polypropylene, comprising the steps of:
    obtaining a mold to form a contact lens, wherein the mold includes a first mold half having a first molding surface in contact with the lens-forming material and a second mold half having a second molding surface in contact with the lens-forming material, wherein said first mold half and said second mold half are configured to receive each other such that the cavity is formed between said first and second molding surfaces, wherein the mold is made of a poly(cycloalkylene-dialkylene terephthalate) copolymer, wherein the poly(cycloalkylene-dialkylene terephthalate) copolymer comprises repeating units from at least 90 mole percent terephthalic acid and at least 90 mole percent of a $C_6$-$C_{24}$ cycloaliphatic diol, based on 100 mole percent dicarboxylic acid and 100 mole percent diol, wherein the mold is not degassed and stored in an oxygen-free atmosphere;
    introducing a lens forming material into the mold, wherein the lens forming material is a silicone hydrogel lens-forming material comprising an organic solvent and at least one polymerizable component selected from the group consisting of a silicon-containing monomer, a silicone-containing macromer, a silicone-containing prepolymer, and a mixture thereof;
    closing the mold and swelling locally the mold at and near the first and second molding surfaces by waiting for at least about 5 minutes before polymerization of the lens forming material in the mold; and
    polymerizing the lens forming material in the mold with localized and limited swelling at or near the molding surfaces thereof to obtain a silicone hydrogel contact lens having an increased ion permeability and the significantly reduced lathe marks.

2. The method of claim 1, wherein the $C_6$-$C_{24}$ cycloaliphatic diol is any one of or combination of diols of formula (IV), (V) and (VI)

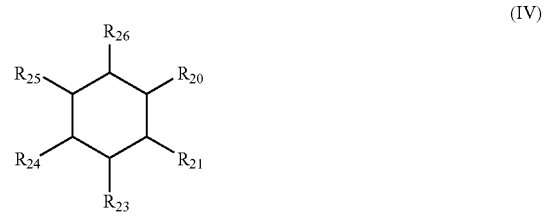

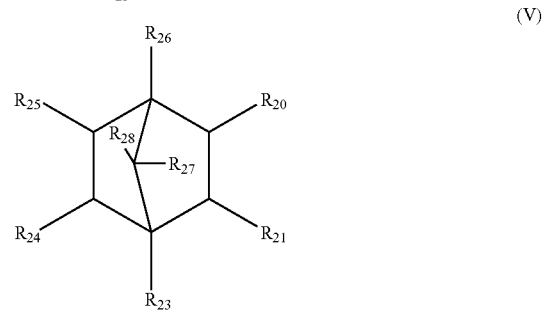

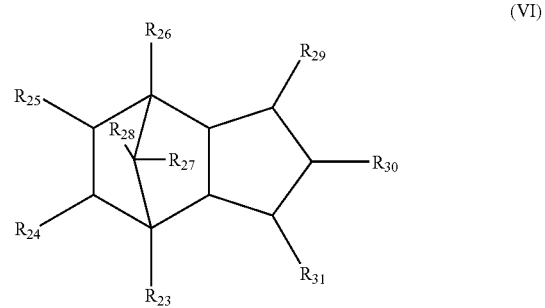

wherein one of $R_{20}$ and $R_{21}$ is $C_1$-$C_3$ hydroxyalkyl and the other is hydrogen or $C_1$-$C_3$ alkyl; one of $R_{24}$ and $R_{25}$ is $C_1$-$C_3$ hydroxyalkyl and the other is hydrogen or $C_1$-$C_3$ alkyl;
one of $R_{29}$, $R_{30}$ and $R_{31}$ is $C_1$-$C_3$ hydroxyalkyl and the other two independent of each other are hydrogen or $C_1$-$C_3$ alkyl; $R_{23}$, $R_{26}$, $R_{27}$, and $R_{28}$ independent of each other are hydrogen or $C_1$-$C_3$ alkyl.

3. The method of claim 2, wherein the $C_6$-$C_{24}$ cycloaliphatic diol is: (1) 1,4-cyclohexenedimethanol; (2) a diol of formula (V) in which $R_{20}$ and $R_{24}$ are hydroxymethyl, $R_{21}$ and $R_{25}$ are hydrogen, and $R_{23}$, $R_{26}$, $R_{27}$, and $R_{28}$ independent of each other are hydrogen or methyl; (3) a diol of formula (VI) in which $R_{30}$ and $R_{24}$ are hydroxymethyl, $R_{21}$, $R_{22}$, $R_{23}$, $R_{25}$, $R_{26}$, $R_{27}$, $R_{28}$, $R_{29}$, and $R_{31}$ independent of each other are hydrogen or methyl; or (4) a combination thereof.

4. The method of claim 2, wherein the poly(cycloalkylene-dialkylene terephthalate) copolymer substantially consists of repeating units from terephthalic acid and $C_6$-$C_{24}$ cycloaliphatic diol.

5. The method of claim 1, wherein the ion permeability of the silicone hydrogel lens is at least 1.5 folds of the ion permeability of the control silicone hydrogel lens obtained by cast molding of the silicone hydrogel lens formulation in a mold of polypropylene.

6. The method of claim 1, wherein the step of polymerizing the lens-forming material is performed thermally or actinically.

7. The method of claim 1, wherein the poly(cycloalkylene-dialkylene terephthalate) copolymer has an oxygen permeability of about 32,500 cc·μm/m$^2$·day·atm at a specific temperature and relative humidity as defined by the AST method D-3985 of classification, wherein the mold is capable of producing contact lenses having reduced lathe marks, compared to a control mold of polypropylene, without polishing the surfaces of mold tools for injection molding of both the mold and the polypropylene mold to remove the lathe marks on the mold tools.

8. The method of claim 2, wherein the ion permeability of the silicone hydrogel lens is at least two folds of the ion permeability of the control silicone hydrogel lens obtained by cast molding of the silicone hydrogel lens formulation in a mold of polypropylene.

9. The method of claim 3, wherein the ion permeability of the silicone hydrogel lens is at least two folds of the ion permeability of the control silicone hydrogel lens obtained by cast molding of the silicone hydrogel lens formulation in a mold of polypropylene.

10. The method of claim 4, wherein the ion permeability of the silicone hydrogel lens is at least two folds of the ion permeability of the control silicone hydrogel lens obtained by cast molding of the silicone hydrogel lens formulation in a mold of polypropylene.

11. The method of claim 6, wherein the ion permeability of the silicone hydrogel lens is at least two folds of the ion permeability of the control silicone hydrogel lens obtained by cast molding of the silicone hydrogel lens formulation in a mold of polypropylene.

12. The method of claim 7, wherein the ion permeability of the silicone hydrogel lens is at least two folds of the ion permeability of the control silicone hydrogel lens obtained by cast molding of the silicone hydrogel lens formulation in a mold of polypropylene.

* * * * *